United States Patent [19]

Kaufmann et al.

[11] 4,292,423
[45] Sep. 29, 1981

[54] PROCESS FOR THE PREPARATION OF ORGANOPOLYSILOXANES

[75] Inventors: Rudolf Kaufmann; Johann Müller; Karl-Heinrich Wegehaupt, all of Burghausen, Fed. Rep. of Germany

[73] Assignee: Wacker-Chemie GmbH, Munich, Fed. Rep. of Germany

[21] Appl. No.: 134,407

[22] Filed: Mar. 27, 1980

[30] Foreign Application Priority Data

Apr. 19, 1979 [DE] Fed. Rep. of Germany ....... 2915751
May 25, 1979 [DE] Fed. Rep. of Germany ....... 2921375

[51] Int. Cl.$^3$ .............................................. C08G 77/06
[52] U.S. Cl. ................................. 528/18; 260/37 SB; 528/28; 525/477; 556/420
[58] Field of Search ................... 528/18, 28; 525/477; 556/420; 260/37 SB

[56] References Cited

U.S. PATENT DOCUMENTS 3,993,606  11/1976  von Bonin et al. ................. 521/111

FOREIGN PATENT DOCUMENTS 832520   1/1970  Canada .
888938   2/1962  United Kingdom .
1342229  1/1974  United Kingdom .

*Primary Examiner*—Melvyn I. Marquis

[57] ABSTRACT

Organopolysiloxanes having substituted carbamoyloxy groups ($\equiv$SiOCO—NH—) bonded to silicon via oxygen, which are prepared by reacting an organopolysiloxane containing Si-bonded hydroxyl groups with an organic isocyanate in the presence of an organic tin compound.

The stability of the organopolysiloxanes containing carbamoyloxy groups may be improved if the organopolysiloxane having Si-bonded hydroxyl groups is reacted with an organic isocyanate in the presence of an organic tin compound which is supported on a solid carrier and then the reaction product is filtered under anhydrous conditions to remove the supported organic tin compound.

4 Claims, No Drawings

PROCESS FOR THE PREPARATION OF ORGANOPOLYSILOXANES

The present invention relates to a process for preparing organopolysiloxanes and more particularly to a process for preparing organopolysiloxanes containing substituted carbamoyloxy groups ($\equiv$SiOCO—NH—) which are bonded to silicon via oxygen.

BACKGROUND OF THE INVENTION

It is generally known that organosilicon compounds containing substituted carbamoyloxy groups ($\equiv$SiOCO—NH—) which are bonded to silicon via oxygen can be prepared by reacting organosilanols with isocyanates. Also, British Pat. No. 888,938 suggests that polysiloxanes containing Si-bonded hydroxyl groups can be reacted with bivalent or trivalent isocyanates. However, when the polysiloxanes contain SiC-bonded organic radicals instead of alkoxypolysiloxanes, such as di-tert-butoxypolysiloxanes, the reacton with the isocyanates does not produce organopolysiloxanes containing carbamoyloxy groups. Often no reaction will take place, or when a reaction does occur, only water is split off from the Si-bonded hydroxyl groups of the diorganopolysiloxanes, thereby resulting in an increase in the viscosity of the organopolysiloxanes. In contrast to the teachings of the British patent, the process of this invention results in the formation of organopolysiloxanes having substituted carbamoyloxy groups bonded to silicon atoms via oxygen.

Adhesive repellent coatings are described in Canadian Pat. No. 832,520 and British Pat. No. 1,342,229 in which an organopolysiloxane having Si-bonded hydroxyl groups is mixed with an organic isocyanate, an organic tin compound, a silicic acid ester and an organopolysiloxane containing Si-bonded hydrogen or an acetoxysilane. These patents do not, however, disclose reacting an organopolysiloxane having hydroxyl groups with an organic isocyanate as the sole reactants in the presence of an organic tin compound to form an organopolysiloxane having substituted carbamoyloxy groups bonded to silicon via oxygen. Likewise, these patents are devoid of any suggestion that the compositions or coatings contain substituted carbamoyloxy groups which are bonded to the silicon atoms of the organopolysiloxane via oxygen atoms.

Therefore, it is an object of this invention to provide organopolysiloxanes having substituted carbamoyloxy groups bonded to the silicon atoms via oxygen. Another object of this invention is to provide organopolysiloxanes having substituted carbamoyloxy groups bonded to the silicon atoms via oxygen which have improved stability. A further object of this invention is to provide a process for preparing organopolysiloxanes having substituted carbamoyloxy groups bonded to silicon atoms via oxygen. A still further object of this invention is to provide a process for improving the stability of organopolysiloxanes having substituted carbamoyloxy groups bonded to silicon atoms via oxygen.

SUMMARY OF THE INVENTION

The foregoing objects and others which will become apparent from the following description are accomplished in accordance with this invention, generally speaking, by providing organopolysiloxanes having substituted carbamoyloxy groups bonded to the silicon atoms of said organopolysiloxanes via oxygen atoms. These organopolysiloxanes are prepared by reacting an organopolysiloxane having at least one Si-bonded hydroxyl group with at least one monovalent or polyvalent organic isocyanate as the sole reactants in the presence of an organic tin compound.

DETAILED DESCRIPTION OF THE INVENTION

The organopolysiloxane having at least one Si-bonded hydroxyl group which is used in the process of this invention, preferably consists of diorganosiloxane units, monoorganosiloxane units, triorganosiloxane units and $SiO_{4/2}$ units or a mixture consisting of at least two of the above mentioned units, provided that the number of $SiO_{4/2}$ units does not exceed the number of diorganosiloxane, monoorganosiloxane and/or triorganosiloxane units; and that at least one of the siloxane-oxygen atoms of each molecule must be substituted with a hydroxyl group and that at least two siloxane units and preferably at least three siloxane units must be present for each molecule. There may be 1,000 or more siloxane units per molecule. Furthermore, it is preferred that all silicon valences which are not satisfied by SiC-bonded organic radicals and hydroxyl groups, be satisfied by siloxane-oxygen atoms and that at least 2 diorganosiloxane units and/or at least 2 Si-bonded hydroxyl groups be present for each molecule. Due to their availability, it is preferred that the number of monoorganosiloxane units present be in excess of the number of triorganosiloxane units which are present. In the process of this invention, a diorganopolysiloxane containing an Si-bonded hydroxyl group in each of its terminal units is especially preferred as the organopolysiloxane having at least one Si-bonded hydroxyl group.

The monoorganosiloxane units may be represented by the formula $RSiO_{3/2}$; the diorganosiloxane units may be represented by the formula $R_2SiO$ and the triorganosiloxane units may be represented by the formula $R_3SiO_{\frac{1}{2}}$. In the above formulas, R represents the same or different monòvalent hydrocarbon radicals which may contain substituents which are inert with respect to the isocyanates, especially fluorine and/or chlorine. It is preferred that the organic radicals bonded to the organopolysiloxane contain from 1 to 12 carbon atoms per radical.

Examples of organic radicals bonded to the organopolysiloxane which may be used in this invention are hydrocarbon radicals, for example, alkyl radicals, such as the methyl, ethyl, n-propyl, isopropyl, n-butyl and sec-butyl radicals as well as octyl and dodecyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radicals such as the tolyl radicals and aralkyl radicals such as the benzyl radical. Examples of substituted hydrocarbon radicals represented by R are the 1,1,1-trifluoropropyl radical and alpha,alpha,alpha-trifluorotolyl radicals as well as chlorophenyl and dichlorophenyl radicals. However, because they are more readily available, it is preferred that at least 80 percent of the number of organic radicals bonded to the organopolysiloxane be methyl radicals.

When the isocyanates used in the process of this invention ar polyvalent isocyanates, then they should preferably contain not more than about 10 isocyanate groups per molecule. The isocyanates used in this process may be monomeric compounds and/or polymers. Examples of isocyanates which may be used in the process of this invention are phenylisocyanate, p-ethoxyphenylisocyanate, o-, m- and p-tolylisocyanates, naphthylenediisocyanate, diphenylmethane-4,4'-diisocyanate, tolylenediisocyanates, triphenylmethane-4,4',4''-triisocyanate and polyphenylpolymethylenepolyisocyanates, as well as a product sold under the registered trademark "Desmodur L", which is a reaction product of tolylenediisocyanates and 1,1,1-trimethylolpropane. Other examples of polyvalent isocyanates which may be used in this invention, are described in U.S. Pat. No. 3,993,606, to Bonin et al, which is incorporated herein by reference.

Polyvalent isocyanates, especially those having 2 or 3 isocyanate groups per molecule, are preferred.

The isocyanate is preferably used in a ratio of isocyanate (—NCO) to Si-bonded hydroxyl group of at least 1:1, i.e., at least one gram mole isocyanate group per gram mole of Si-bonded hydroxyl group. It is possible to use 100 or more gram moles of isocyanate groups for each mole of Si-bonded hydroxyl group.

Examples of organic tin compounds which may be used are di-n-butyltin diacetate, di-n-butyltin dilaurate, di-n-butyltin oxide, tin (II)-2-ethyl-hexoate, a mixture of di-n-butyltin diacylates wherein the acylate groups are derived from a mixture of carboxylic acids containing from 9 to 11 atoms per molecule, in which the carboxyl group of at least 90 percent by weight of the acids are bonded to a tertiary carbon atom; di-n-butyltin di-2-ethylhexoate and distannoxanes, such as diacetoxytetra-n-butyldistannoxane and dioleoyltetramethyldistannoxane. Also, mixtures of various organic tin compounds may be used. The preferred organic tin compound is di-n-butyltin dilaurate.

The organic tin compound is preferably used in an amount of from 0.001 to 5 percent by weight, based on the weight of the organopolysiloxane containing at least one Si-bonded hydroxyl group.

In order to conduct the process of this invention at a low temperature and/or very rapidly, and especially in order to obtain a reaction product which is stable under storage conditions, it is preferred that the organopolysiloxane containing at least one Si-bonded hydroxyl group be reacted with an organic isocyanate in the presence of an organic tin compound which is supported on a solid material. Then the catalyst may be removed by filtering the reaction product under anhydrous conditions.

Examples of material which may be used as a support for the tin compounds in the process of this invention are activated carbon, silicon dioxides, aluminum oxides, graphite carbons, silicon carbide, clays including bentonites and zeolites. Activated carbon is the preferred support for the tin compounds. These solid materials should be used in a form in which they are substantially free of water and their reaction should be neutral. The solid materials are preferably used in an amount of from 5 to 500 parts by weight and more preferably from 10 to 150 parts by weight, based on the weight of the organic tin compound.

The organic tin compound may be applied to the support in a solvent which is inert to the tin compound, for example acetone, which may then be removed by evaporation after the organic tin compound has been applied. Evaporation may be carried out under decreased pressure.

Also, it is possible to conduct the reaction in the presence of an anhydrous solvent which is inert to the reactants as well as the reaction products. Examples of suitable solvents are hydrocarbons such as toluene, halogenated hydrocarbons such as perchloroethylene and methylene chloride; esters such as ethyl acetate, and ethers such as tetrahydrofuran, di-n-butylether or dioxane. Mixtures of various solvents may also be employed.

The process of this invention is preferably carried out at a temperature of from room temperature and up to about 150° C. Likewise, it is preferred that the process be conducted at atmospheric pressure, i.e., at 1 bar or at about 1 bar. However, higher or lower pressures may also be used. The process may be conducted as a batch process, or as a semicontinuous process or as a continuous process in the presence or absence of agitation. The solid support may be used as a fluidized or as a solid bed.

When the isocyanate is employed in an amount that an excess of from 1 to 10 isocyanate groups are present, the compounds prepared in accordance with this invention contain a carbamoyloxy group of the formula:

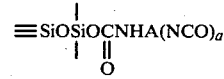

where a represents an integer having a value of from 1 to 9 and A represents the organic radical of the isocyanate molecule to which the isocyanate group(s) was or were originally bonded.

Compounds obtained in accordance with this invention may be used for example as lubricants for organic or inorganic fibers, as coatings for glass, or to improve the appearance and feel of synthetic and natural leather, as well as additives in manufacturing or processing of polyurethanes.

In the following examples all percents are by weight, unless otherwise specified.

EXAMPLE 1

About 200 g of a dimethylpolysiloxane having an Si-bonded hydroxyl group on each of its terminal units and containing about 13 silicon atoms per molecule with a refractive index of 1.404, are mixed with 11.76 g of a mixture containing 80 percent of 2,4-tolylenediisocyanate and about 20 percent 2,6-tolylenediisocyanate, 200 ml of toluene and 4 g of a catalyst mixture. The catalyst mixture is obtained by suspending 19 g of activated carbon in 100 g of acetone and thereafter mixing the suspension with 1 g of di-n-butyltin dilaurate and then distilling off the acetone. The mixture of reactants is refluxed for one hour, then cooled to room temperature and filtered under anhydrous conditions. After distilling off the toluene, the filtrate consists of a clear, slightly yellow oil which has a refractive index of 1.417.

After storing under anhydrous conditions over a period of several weeks, a 50 percent solution of this oil in toluene remains unchanged. When exposed to atmospheric moisture, the solution decomposes with the evolution of gas and forms a solid.

EXAMPLE 2

About 1000.5 g of a commercially available product identified as "Desmodur L" (available from Farbenfabriken Bayer AG) which is a 75 percent solution of a product obtained from the reaction of tolylenediisocyanates and 1,1,1-trimethylolpropane in ethyl acetate are mixed with 450 g of ethyl acetate, then with 88.5 g of di-n-butylether, and then with 19.5 g of the catalyst mixture prepared in Example 1 which consists of activated carbon and di-n-butyltin dilaurate, and finally with 30 g of a dimethylpolysiloxane containing an Si-bonded hydroxyl group in each of its terminal units and having an average of about 13 silicon atoms per molecule. The resultant mixture is refluxed for 1 hour, then cooled to 50° C., and filtered under anhydrous conditions. The filtrate is a clear, light greenish-yellow color and when stored under anhydrous conditions it remains unchanged even after several months. When applied to a piece of glass, it forms a hard, clear film.

EXAMPLE 3

About 18.5 g of activated carbon is suspended in 450 g of ethyl acetate. The suspension is mixed first with 1 g of di-n-butyltin dilaurate, then with 1000.5 g of a 75 percent solution of a product obtained from the reaction of tolylenediisocyanates and 1,1,1-trimethylolpropane in ethyl acetate, then with 88.5 g of di-n-butylether and finally with 30 g of a dimethylpolysiloxane having an Si-bonded hydroxyl group in each of its terminal units and having an average of about 13 silicon atoms per molecule. The resultant mixture is refluxed for 1 hour, then cooled to 50° C., and filtered under anhydrous conditions. The filtrate thus obtained has the same properties as the filtrate obtained in Example 2.

Comparison Example (a)

A mixture containing 5 g of ethyl acetate and 10 g of a 75 percent solution of a product obtained from the reaction of tolylenediisocyanates and 1,1,1-trimethylolpropane in ethyl acetate are mixed with 0.38 g of a dimethylpolysiloxane containing an Si-bonded hydroxyl group in each of its terminal units and having on the average about 13 silicon atoms per molecule. The resultant mixture is cloudy due to the fact that the organopolysiloxane is not soluble in the mixture. When stored under anhydrous conditions for several days the mixture remains unchanged. When applied to a glass plate, the mixture forms a hard, opaque film.

Comparison Example (b)

To about 29.2 g of a 75 percent solution of a product obtained from the reaction of tolylenediisocyanates and 1,1,1-trimethylolpropane in ethyl acetate which was heated to 75° C. under anhydrous conditions, are added dropwise 200 g of a dimethylpolysiloxane containing an Si-bonded hydroxyl group in each of its terminal units and having on the average about 13 silicon atoms per molecule. The resultant mixture is refluxed for 2 hours. A colorless powdery precipitate is obtained which is substantially free of organopolysiloxane. The viscosity of the organopolysiloxane layer above the precipitate is greater than the viscosity of the original organopolysiloxane solution employed.

EXAMPLE 4

The mixture prepared in accordance with the procedure described in Comparison Example (a) is mixed with 0.1 g of di-n-butyltin dilaurate and allowed to stand for 15 hours at room temperature under anhydrous conditions. An essentially clear solution is obtained. When a sample of this mixture is applied to a piece of glass, it forms a hard, slightly opaque film. After a few days the solution gels.

EXAMPLE 5

About 200 g of a dimethylpolysiloxane containing an Si-bonded hydroxyl group in each of its terminal units and having on the average about 13 silicon atoms per molecule, are mixed with 11.76 g of a mixture containing about 80 percent 2,4-tolylenediisocyanate and about 20 percent 2,6-tolylenediisocyanate, 200 ml of toluene and 0.2 g of di-n-butyltin dilaurate. The resultant mixture is refluxed for 2 hours. After the mixture has cooled to room temperature, it forms an essentially clear solution which gels within 2 days. When the components which distill at 20 mbar and at 110° C. are removed from a freshly prepared solution, a yellowish oil is obtained which after two days forms a solid even though it was not exposed to moisture.

What is claimed is:

1. A process for preparing organopolysiloxanes having substituted carbamoyl groups which are bonded to silicon through oxygen, which comprises reacting a diorganopolysiloxane having at least one Si-bonded hydroxyl group with an organic isocyanate having at least 2 isocyanate groups per molecule as the sole reactants in the presence of a catalytic amount of an organic tin compound supported on a solid material and thereafter separating the resultant reaction product from the catalyst under anhydrous conditions.

2. The process of claim 1 wherein the product obtained from the reaction of the organopolysiloxane and the organic isocyanate is filtered under anhydrous conditions to remove the catalyst.

3. The process of claim 1, wherein activated carbon is used as the support for the tin compound.

4. An organopolysiloxane obtained from the process of claim 1 which has at least one carbamoyloxy group of the formula $\equiv$SiOCO—NH— bonded to the silicon atom of the diorganopolysiloxane via oxygen.

* * * * *